United States Patent [19]

Trostler

[11] 3,819,905

[45] June 25, 1974

[54] HEATER CONTROL SYSTEM

[76] Inventor: Richard M. Trostler, 1730 Woodbend Dr., Claremont, Calif. 91711

[22] Filed: Mar. 19, 1973

[21] Appl. No.: 342,522

[52] U.S. Cl. ................ 219/501, 219/505, 219/526
[51] Int. Cl. .......................................... H05b 1/02
[58] Field of Search ................ 219/501, 505, 526; 174/52 PE

[56] References Cited
UNITED STATES PATENTS

| | | | |
|---|---|---|---|
| 3,027,627 | 4/1962 | Sturdy | 174/52 PE |
| 3,098,950 | 7/1963 | Geshner | 174/52 PE |
| 3,581,062 | 5/1971 | Aston | 219/505 |

*Primary Examiner*—J. D. Miller
*Assistant Examiner*—Fred E. Bell
*Attorney, Agent, or Firm*—Bernard V. Ousley

[57] ABSTRACT

A heater control system for water bed heaters, in which system temperature sensing circuitry with a temperature sensing element is packaged together with the power supply circuitry for the temperature sensing circuitry, heat sinks are provided to thermally isolate the temperature sensing element from heat given off the power supply circuitry and to also expose the temperature sensing element to the temperature of an adjacent water bed bladder, and electrostatic shielding is provided to avoid capacitive coupling between the sensing circuitry and an adjacent body of water, the water in a water bed bladder, the temperature sensing circuitry including a switch to supply power to a water bed heater at selected temperatures.

5 Claims, 4 Drawing Figures

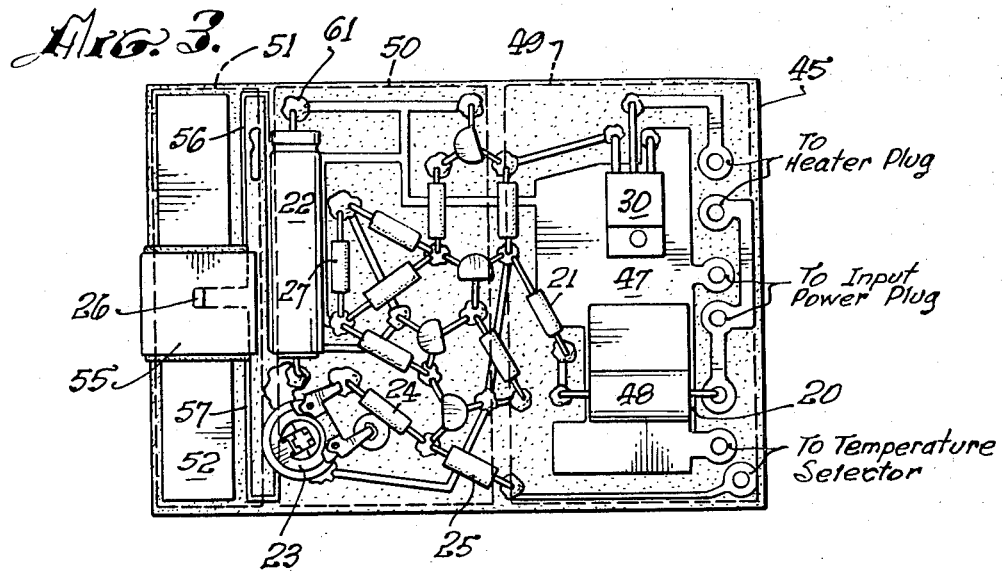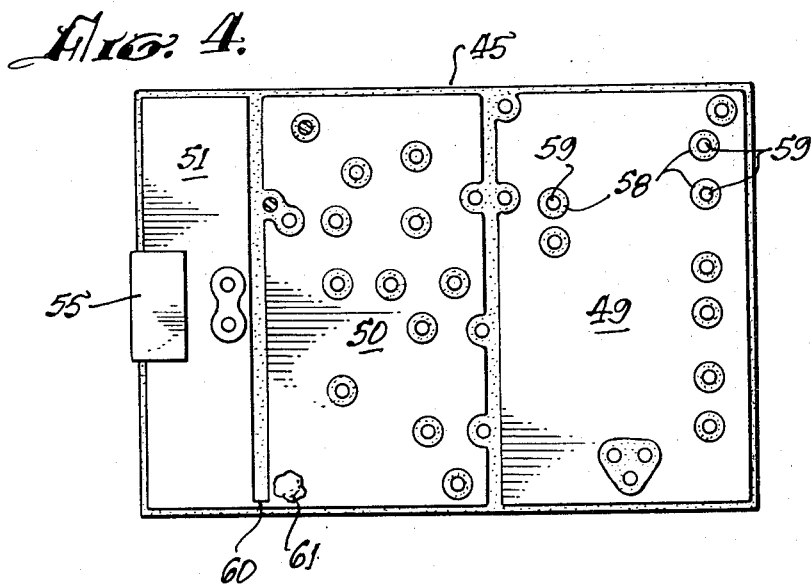

HEATER CONTROL SYSTEM

BACKGROUND OF THE INVENTION

The present invention relates to a heater control system for water bed heaters. The usual water bed has a water filled bladder with a heater situated beneath it to heat the water to a temperature that is comfortable to the human body. The heater must be turned on and off intermittently, and as dictated by the surrounding environment, to maintain the water temperature at a desired temperature. A control system is utilized to turn the heater on and off. The control system must, of course, be able to detect the water temperature.

Prior control systems for water bed heaters fall into two categories, those using a temperature sensitive liquid, and those using temperature sensitive electronic elements. The "liquid" type uses the temperature sensitive expansion characteristics of a liquid to activate a switch that turns the heater on and off. The liquid is contained in a metal bulb positioned under the water bed bladder, and it is connected by a long, thin copper tube to a control box. Due to the fragile nature of the tubing, the control box must be attached to the bed frame to minimize tube flexing. If the tube ruptures or leaks, the control is inoperative. The temperature adjustment resolution of this type of control is very poor, its durability is poor, and its operating action produces loud clicks. Further, its operation produces sparks, which can be dangerous in a high-oxygen, hospital environment.

The type of control system that uses temperature sensitive electronic components utilizes a temperature sensitive electrical element that is placed under the water bed bladder and connected by electrical cord to a control box. The power supply control circuitry in the control box must dissipate the heat it generates into the air. As a result the control box is undesireable in its size and structure. This type of control box is either attached to the bed frame or hung directly on an electrical wall outlet, the latter arrangement interfering with furniture arrangements in the room, an annoyance to the distaff side of the family.

SUMMARY OF THE INVENTION

The present invention solves these problems by its unique structure. Solid state electronic circuitry is used to eliminate the problems inherent in the "liquid" type unit. The heat dissipation problems of prior electronic type units are eliminated by using the water bed bladder itself as a heat sink to dispose of the heat inherently given off by this type of circuitry, since water absorbs heat much more efficiently than does air. In addition, when this heat is dissipated by an air heat sink it is wasted, but when it is absorbed by the water bed it is used where it is needed and desired. Further, the present control unit is encased in a water and air impermeable substance or filler, making it very safe in oxygen environments, and safe should the water bladder leak. Finally, the present control system is designed to be placed directly under the water bed bladder, right along with the heater, and no attachment to the bed frame or wall is needed. Still other advantages will become apparent from the detailed description of the invention and accompanying drawings, wherein:

BRIEF DESCRIPTION OF THE DRAWINGS

FIG. 3 is botton view of that portion of the unit normally encapsulated in a filler material, but with the filler material removed and not shown, exposing to view the actual physical arrangement of electrical components, electronic circuit board, and heat sinks; and FIG. 4 is a top view of the structure shown in FIG. 3, once again with the filler material removed, and in this view the heat sinks are seen in detail.

DESCRIPTION OF THE PREFERRED EMBODIMENT

Figure 1:
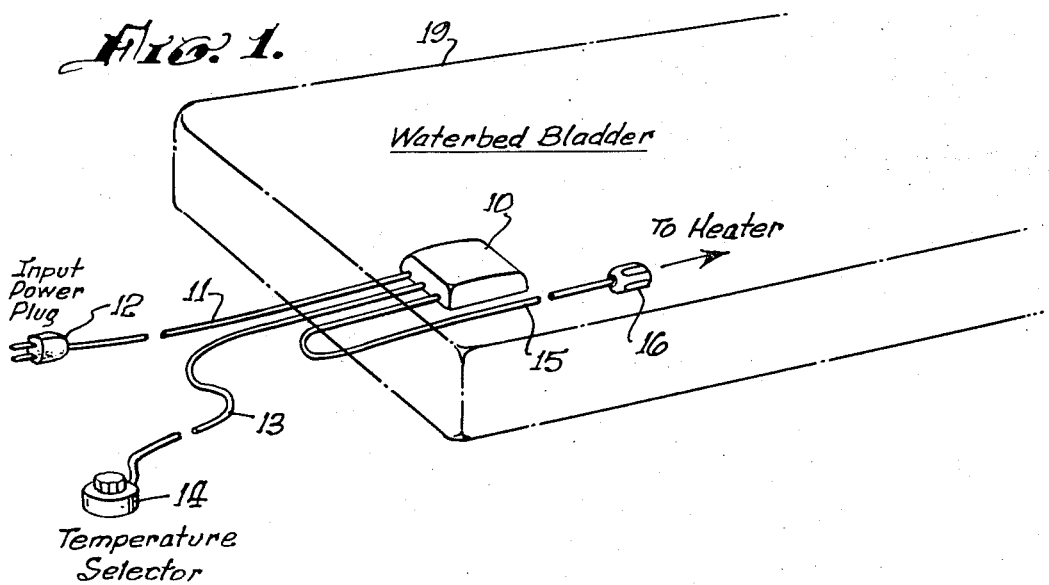
FIG. 1 is a perspective view of the exterior of the control system, with a water bed bladder shown in phantom outline.

Referring more particularly to the drawings, FIG. 1 shows a capsule 10 with three electrical leads emanating therefrom. Lead 11 terminates in an electrical input power plug 12 that is adapted for use with standard 110 volt 60 cycle electrical outlets. Lead 13 is attached to a temperature selector 14, which in a preferred embodiment is a potentiometer. Lead 15 terminates in a receptacle plug 16 adapted to receive the input plug of a heater. A water bed bladder 19 filled with water is illustrated in phantom outline, with capsule 10 placed beneath the bladder.

Figure 2:
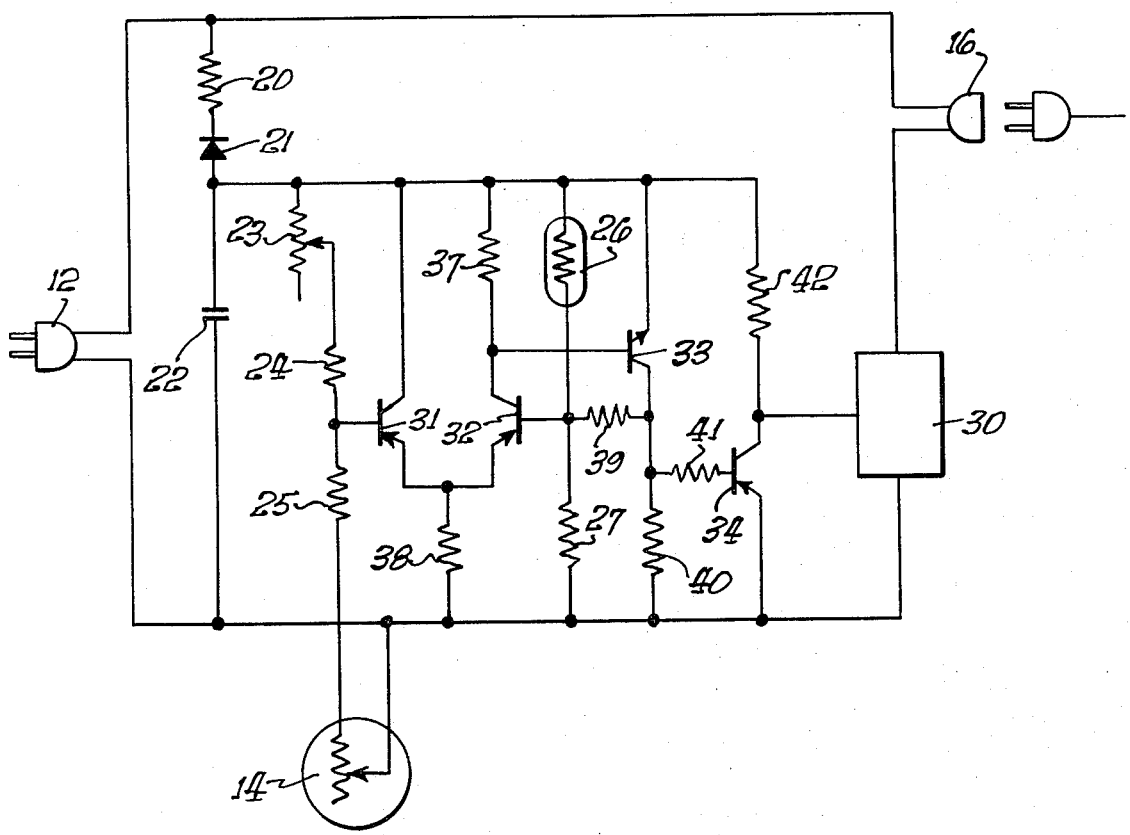
FIG. 2 is a schematic of the electronic circuitry portion of the invention.

FIG. 2 shows the circuitry employed in the invention. The circuitry includes power supply control circuitry and temperature sensing circuitry. The power supply control circuitry functions to control the electrical power fed to and utilized by the temperature sensing circuitry. The power supply control circuit includes a power supply resistor 20, diode 21, and capacitor 22. This power supply control circuitry reduces the input line voltage from 110 volts A.C. to 20 volts D.C. so a substantial amount of heat is given off by resistor 20.

The temperature sensing circuitry, as illustrated in FIG. 2 is a balanced bridge circuit with its output amplified and fed to a switch 30. In the preferred embodiment the switch is a bilateral silicon controlled rectifier. One such switch is the "Triac" manufactured by the ECC Corporation of Euless, Texas. The two sides of the bridge circuit consist, in the preferred embodiment shown, of variable resistor 23, resistors 24, 25, and potentiometer 14, as one side of the bridge circuit, and thermistor 26 and resistor 27 as the other side. The thermistor is the temperature sensitive element that detects the temperature of the water bed. Since the temperature of resistor 20 will be in the area of 40° F higher than that of the water bed and thermistor 26, it is necessary to thermally isolate thermistor 26 from resistor 20, and other heat producing elements in the circuitry. The means whereby this is accomplished will be discussed later on. The amplification stage of the circuitry is standard transistor amplifier circuitry, with transistors 31, 32, 33, 34 and resistors 37 through 42, as shown.

Referring once again to FIG. 2, the potentiometer 14 has a rotational control calibrated in degrees of temperature. In use the rotational control, or knob, is set on the desired temperature. The thermistor on the opposite side of the bridge circuit then works in conjunction with the temperature selecting potentiometer 14 to determine whether or not the water bed temperature is above or below the selected temperature. If the water temperature is below the desired or selected value, the switch 30 will be activated to connect power to the heater receptacle plug 16. If the water temperature is above the desired value, the switch 30 will be opened and power will be disconnected from the heater receptacle plug 16.

The variable resistor 23 is used to calibrate the temperature selecting potentiometer before the circuitry is encapsulated. The circuitry that is encapsulated is all that shown in FIG. 2 except plugs 12, 16, and potentiometer 14, and the electrical leads thereto, as illustrated in FIG. 1.

Turning now to the matter of how thermistor 26 is thermally isolated from the heat producing elements of the power supply circuitry, attention is directed to FIG. 3. This is a bottom view of the actual circuit components. By bottom view it is meant that this is a view as though looking up at the bottom of capsule 10 as it rests under a water bed bladder as shown in FIG. 1. The components are mounted on a dielectric circuit board 45, preferably a glass-epoxy laminate about 1/16 on an inch thick. All the components are mounted on the bottom side of circuit board 45, with heat generating power supply resistor 20 at one end, and heat sensitive thermistor 26 at the other end. Switch 30 is also somewhat of a heat producer so it too is located at the same end of the circuit board as resistor 20.

These heat producers, resistor 20 and switch 30, are firmly secured to a copper plate 47 which acts to spread out the heat generated, and acts as a heat sink. To facilitate the heat from resistor 20 being transmitted to copper plate 47, resistor 20 is tightly encased in copper jacket 48 that is soldered to copper plate 47.

Immediately above copper plate 47, and separated from plate 47 only by the thickness of the glass-epoxy laminate board 45, is another copper plate heat sink 49, clearly seen in the top view illustration of FIG. 4. When encapsulated, plate 49 is covered with only a thin layer of encapsulating material, and thus lies almost immediately adjacent the water bed bladder, whereby heat generated by heat producing power supply resistor 20 is spread out over plate 47, is then conducted by glass-epoxy circuit board 45 to plate 49, and from there to the water bed itself, which rapidly and effectively dissipates the heat.

To further carry off heat from the heat producing resistor 20, before such heat can reach thermistor 26, another copper plate heat sink 50 is provided on the top of the circuit board, as illustrated in FIG. 4. Plate 50 and 49 do not contact each other.

A third copper plate 51 is positioned as shown in FIG. 4 immediately above the location of temperature sensitive thermistor 26. In operation, with the encapsulated unit placed beneath a filled water bed bladder, the heat generated by the power supply resistor 20 and switch 30 do not raise the temperature of plate 51 above the temperature of the water in the water bed bladder, and plate 51 remains at the temperature of the water. Plate 51 accordingly acts as a means of transmitting the water temperature to the thermistor 26.

To further facilitate conduction of the water temperature to thermistor 26, a copper plate 52 is mounted on the glass-epoxy board 45 immediately below plate 51 and separated from plate 51 by only the thickness of board 45. The thermistor 26 is covered on both its top and bottom with a dielectric but thermally conductive tape, such as glass cloth tape, and secured to plate 52 as shown in FIG. 3. And finally, to further facilitate the exposure of the thermistor 26 to the temperature of plate 51 (and the water in a water bed bladder), a copper flange 55, shown in FIG. 3 and 4, is secured to plate 51, which flange curls around the end of board 45 and, on the bottom side as shown in FIG. 3, embraces thermistor 26.

The preferred embodiment disclosed herein utilizes copper for the heat sink plates, but it is to be understood that there are other materials that could be used in place of copper.

To minimize the conduction of heat from the heat producing elements of the electrical circuitry to thermistor 26 by virtue of conduction through the electrical circuitry itself, thermistor 26 is provided with extremely long electrical lead lines 56 and 57 as shown in FIG. 3.

The holes shown in FIG. 4 in the heat sink plates 49, 50, and 51, such as holes 58, as shown in FIG. 4, are provided to insure lack of electrical contact with electrical terminals, such as indicated by numeral 59, which terminals are installed in board 45 for the attachment of electronic components that are depicted in FIG. 3.

It must be recalled that the board 45 with the electrical circuitry thereon is separated from the water of the bed by only a thin layer of encapsulating material. This is generally also true of the water bed heaters presently in use. This means that there is electrical capacitative coupling between the control circuitry and the water, and the heater and the water, since water is an excellent electrical conductor, and there is such a large body of water in a water bed bladder. The result is that there is significant capacitative coupling, through the water, between the control circuitry and the heater. This establishes an electrical feedback loop which is undesirable and which can cause oscillations resulting in improper operation of the control circuitry.

To eliminate this effect, copper heat sink plates 50 and 51 are connected together electrically by a thin metal bridge 60, shown in FIG. 4, and plate 50 is electrically grounded at point 61. This provides an electrostatic shield between the control circuitry and the water, and eliminates the capacitative coupling. The grounding is accomplished through board 45, and point 61 is shown in both FIG. 3 and FIG. 4. The thin bridge 60 is kept very small in size to substantially eliminate the transfer of heat from plate 50 to plate 51 through the bridge.

Returning now to FIG. 1, it is to be recalled that board 45 and the components and heat sinks thereon are all encapsulated in an encapsulating or filler material, with the resulting exterior configuration of this filler material, in the preferred embodiment, being that designated by the numeral 10 in FIG. 1. The filler material in the preferred embodiment is a mixture of resin, fine sand, and a pigment for color. In the manufacturing process, completed board 45 is placed in a mold delineating the desired exterior configuration of the encapsulated unit, and the filler material is poured into the mold and allowed to harden, whereupon it is removed from the mold. The filler material is, of course, a dielectric, but it is also impermeable to air (or oxygen), and water.

To summarize the operation of the invention, the capsule 10 is placed under a water bed bladder. Input power plug 12 is connected to any standard 110 volts 60 cycle outlet. Receptacle plug 16 is connected to a water bed heater that is also beneath the water. Temperature selector 14 is situated beside the bed, but not beneath the water bed bladder.

The temperature desired for the water is selected on the temperature selector. Heat sinks 49 and 50, with the aid of heat sink 47, carry off heat produced by power supply resistor 20 and switch 30 to the water bed bladder. Heat sinks 51 and 52, with aid of flange 55, expose thermistor 26 to the temperature of the water bed bladder.

The bridge circuitry shown in FIG. 2, which contains both thermistor 26 and temperature selector 14, then dictates whether or not switch 30 supplies electrical power to the heater via plug 16.

The thermistor 26 is thermally isolated from heat producing electrical components by the use of a plurality of heat sinks 49, 50, and 51 shown in FIG. 4. The bridge circuit control circuitry and its output amplification components are shielded from capacitative coupling with the water by the electrical grounding of plates 50 and 51.

The present invention enables an operator to hold a selected water temperature to less than 2/10 of one degree farenheit. The need for such precise control is that the human body continually generates heat in its normal functioning, and some of this heat is dissipated by the skin. When the surrounding air temperature is in the 70° F range then a person feels comfortable because the air is cool enough compared to normal skin temperature of about 92° F to take away just the right amount of heat. If the air temperature goes up, the person starts to perspire. If the air temperature goes down, the person shivers to increase the amount of body temperature generated.

Since water is a much better conductor of heat than air, to dissipate the same amount of body heat, the water bed temperature need only be about 2° F cooler than normal body temperature, instead of about 17° F degrees cooler for air. If the air temperature changes one or two degrees it doesn't make much difference, but if a water bed temperature were to change that much, its greater ability to conduct heat would magnify the effect of this change and the person lying on the bed would be very uncomfortable. As a result, the present invention was designed for very accurate control of the water bed temperature. Also, for the reasons explained, the temperature range which is selectable by the temperature selector, in the preferred embodiment, is 82° F to 96° F. The use of even this full a range is unlikely, however, by the average person.

Although specific embodiments of the present invention have been described and illustrated, it is to be understood that the same are by way of illustration and example, and are not intended as limitations of the present invention, the delineation of which is the purpose of the following claims:

I claim:

1. A water bed heater control system comprising:
power supply circuitry, said power supply circuitry having heat producing elements;
sensing circuitry, said sensing circuitry having a temperature sensitive element;
said heat producing elements of said power supply circuitry positioned spacially distant from said temperature sensitive element;
said power supply circuitry and said sensing circuitry imbedded together in a filler material, said filler material being impermeable to air and water, said filler material being a dielectric but thermally conductive material, said filler material having a substantially smooth top surface;
means imbedded in said filler material for dissipating heat generated by said heat producing elements of said power supply circuitry;
means imbedded in said filler material for thermally isolating said temperature sensitive element from said heat producing elements of said power supply circuitry, said imbedded means comprising long electrical lead lines to said temperature sensitive element, and a plurality of metal plates lying in the same plane and lying parallel to said top surface of said filler material, said metal plates being spacially adjacent said top surface, said metal plates substantially spanning the distance between said heat producing elements and said temperature sensitive element to provide a plurality of heat sinks to carry heat off to said top surface for conduction to an adjacent body such as a water bed bladder;
means imbedded in said filler material for electrostatically shielding said sensing circuitry; and
means imbedded in said filler material for transmitting heat originating exteriorly to said top surface of said filler material to said temperature sensitive element.

2. The control system defined in claim 1, wherein said means for dissipating heat generated by said power supply circuitry comprises a metal plate lying parallel to said top surface of said filler material and spacially interposed between said top surface and said heat producing elements of said power supply circuitry, whereby said metal plate acts as a heat sink to carry heat away from said heat producing elements and transmit it to the top surface of the filler material for conduction to an adjacent body such as a water bed bladder.

3. The control system defined in claim 1, wherein said power supply circuitry is adapted to utilize an electrical input of 110 volts, 60 cycles, and wherein said sensing circuit comprises a bridge circuit with amplified output signal, an electronic switch connected to and controlled by said amplified output signal from said bridge circuit, said electronic switch having a power input line to receive electrical power and power output line to transmit electrical power to a load such as a water bed heater, the amplified output signal from said bridge circuit controlling when said electronic switch permits the passage of electrical power from its power input line to its power output line, and said bridge circuit including a temperature sensitive element and variable electrical impedance element whereby a setting can be selected to cause the electronic switch to operate at temperatures below a desired temperature experienced by said temperature sensitive element.

4. A water bed heater control system comprising:
power supply circuitry, said power supply circuitry having heat producing elements;
sensing circuitry, said sensing circuitry having a temperature sensitive element;
said power supply circuitry and said sensing circuitry imbedded together in a filler material, said filler material being impermeable to air and water, said filler material being a dielectric but thermally conductive material, said filler material having a substantially smooth top surface;

means imbedded in said filler material for dissipating heat generated by said heat producing elements of said power supply circuitry;

means imbedded in said filler material for thermally isolating said temperature sensitive element from said heat producing elements of said power supply circuitry;

means imbedded in said filler material for electrostatically shielding said sensing circuitry comprising at least one electronically grounded metal plate lying parallel to said top surface of said filler material and spacially interposed between said top surface and said sensing circuitry, thereby eliminating electrical capacitive coupling between said sensing circuitry and the water bed when said top surface of said filler material is placed next to a filled water bed bladder; and means imbedded in said filler material for transmitting heat originating exteriorly to said top surface of said filler material to said temperature sensitive element.

5. A water bed heater control system comprising:

power supply circuitry, said power supply circuitry having heat producing elements;

sensing circuitry, said sensing circuitry having a temperature sensitive element;

said power supply circuitry and said sensing circuitry imbedded together in a filler material, said filler material being impermeable to air and water, said filler material being a dielectric but thermally conductive material, said filler material having a substantially smooth top surface;

means imbedded in said filler material for dissipating heat generated by said heat producing elements of said power supply circuitry;

means imbedded in said filler material for thermally isolating said temperature sensitive element from said heat producing elements of said power supply circuitry;

means imbedded in said filler material for electrostatically shielding said sensing circuitry; and means imbedded in said filler material for transmitting heat originating exteriorly to said top surface of said filler material to said temperature sensitive element comprising a first metal plate lying parallel to and adjacent to said top surface of said filler material, in position to receive heat from any object adjacent said top surface, such as the bladder of a water bed, a second metal plate lying parallel to and beneath said first metal plate, a thermally conductive dielectric tape secured to said second metal plate, said temperature sensitive element being secured within said tape, and said first metal plate having a flange that curls about said second metal plate and said temperature sensitive element, whereby the temperature at the site of said temperature sensitive element is the same as that of said first metal plate.

* * * * *